US012755990B2

(12) United States Patent
Brown

(10) Patent No.: US 12,755,990 B2
(45) Date of Patent: Oct. 6, 2026

(54) FUEL CELL SYSTEM INCLUDING EJECTOR

(71) Applicant: Versa Power Systems Ltd, Danbury, CT (US)

(72) Inventor: Casy Cloudless Brown, Calgary (CA)

(73) Assignee: VERSA POWER SYSTEMS LTD, Danbury, CT (US)

( * ) Notice: Subject to any disclaimer, the term of this patent is extended or adjusted under 35 U.S.C. 154(b) by 430 days.

(21) Appl. No.: 18/071,914

(22) Filed: Nov. 30, 2022

(65) Prior Publication Data

US 2023/0178763 A1 Jun. 8, 2023

Related U.S. Application Data

(60) Provisional application No. 63/285,274, filed on Dec. 2, 2021.

(51) Int. Cl.

*H01M 8/04089* (2016.01)
*H01M 8/04111* (2016.01)
(Continued)

(52) U.S. Cl.

CPC .... *H01M 8/04097* (2013.01); *H01M 8/04111* (2013.01); *H01M 8/04164* (2013.01); *H01M 8/0618* (2013.01); *H01M 8/0668* (2013.01)

(58) Field of Classification Search

CPC ......... Y02E 60/10; Y02E 60/50; C25B 15/08; F05B 2260/601; F25B 2341/001–0014; H01M 8/04–04059; H01M 8/04082–04216; H01M 8/04291; H01M 8/04343; H01M 8/04402; H01M 8/04425;
(Continued)

(56) References Cited

U.S. PATENT DOCUMENTS 6,670,067 B2 12/2003 Sato et al.
6,858,340 B2 2/2005 Sugawara et al.
(Continued)

FOREIGN PATENT DOCUMENTS

DE 10 2005 044 756 A1 4/2007
DE 10 2017 208 544 11/2018
(Continued)

OTHER PUBLICATIONS

International Search Report and Written Opinion in PCT/US2022/051330, dated Apr. 13, 2023 (15 pages).
(Continued)

*Primary Examiner* — Mayla Gonzalez Ramos
*Assistant Examiner* — Bethany C Garcia
(74) *Attorney, Agent, or Firm* — Foley & Lardner LLP

(57) ABSTRACT

A fuel cell system including a fuel cell module comprising an anode section configured to output an anode exhaust stream, a first junction configured to split the anode exhaust stream into an anode recycle stream and a system outlet stream, and an ejector. The ejector comprises a low pressure inlet configured to receive a suction stream comprising a first portion of the anode recycle stream, a motive inlet configured to receive a motive stream comprising a second portion of the anode recycle stream, and an outlet configured to output an ejector output stream. The anode section is configured to receive an anode input stream that comprises the ejector output stream.

17 Claims, 5 Drawing Sheets

(51) Int. Cl.
*H01M 8/04119* (2016.01)
*H01M 8/0612* (2016.01)
*H01M 8/0668* (2016.01)

(58) Field of Classification Search
CPC ......... H01M 8/04514; H01M 8/04761; H01M 8/04776; H01M 8/04843; H01M 8/04097; H01M 8/0662; H01M 8/06; H01M 8/04119; H01M 8/04156; H01M 8/04164; H01M 8/04171; H01M 8/04179; H01M 8/04828; H01M 8/04492; H01M 8/04462; H01M 8/04141; H01M 8/04007; H01M 2008/147; H01M 8/04746; H01M 8/0606; H01M 8/0612; H01M 8/0618; H01M 8/0625; H01M 8/0693; H01M 8/04201; H01M 8/04014; H01M 8/04753; H01M 8/04328; H01M 8/04111; H01M 2250/20; H01M 8/04089–0668; C01B 2203/066; B01D 2258/0208
See application file for complete search history.

(56) References Cited

U.S. PATENT DOCUMENTS

| | | | |
|---|---|---|---|
| 7,309,537 B2 | 12/2007 | Blaszczyk et al. | |
| 7,449,260 B2 | 11/2008 | Van Dine | |
| 8,092,943 B2 | 1/2012 | Blaszczyk et al. | |
| 8,329,354 B2 | 12/2012 | Fukuma et al. | |
| 8,507,138 B2 | 8/2013 | Yamada et al. | |
| 8,580,443 B2 | 11/2013 | Hakala | |
| 8,672,643 B2 | 3/2014 | Gurin et al. | |
| 8,709,669 B2 | 4/2014 | Lee et al. | |
| 8,722,268 B2 | 5/2014 | Wake et al. | |
| 8,865,369 B2 | 10/2014 | Lamm | |
| 8,920,988 B2 | 12/2014 | Knoop | |
| 9,312,551 B1 | 4/2016 | Hwang et al. | |
| 11,043,682 B2 | 6/2021 | Gagliardo et al. | |
| 2005/0208357 A1 | 9/2005 | Bitzer et al. | |
| 2006/0073363 A1 | 4/2006 | Taniguchi et al. | |
| 2007/0017367 A1* | 1/2007 | McElroy | H01M 8/04097 95/90 |
| 2010/0307431 A1* | 12/2010 | Buchanan | F02M 27/02 123/3 |
| 2014/0087278 A1 | 3/2014 | Knoop | |
| 2014/0212777 A1 | 7/2014 | Hofer et al. | |
| 2015/0333339 A1 | 11/2015 | Noh et al. | |
| 2016/0043413 A1 | 2/2016 | Mcelroy et al. | |
| 2016/0204454 A1 | 7/2016 | Hakala | |
| 2019/0140297 A1* | 5/2019 | Gasda | H01M 8/04303 |
| 2019/0245221 A1* | 8/2019 | Scotto | H01M 8/2484 |
| 2020/0014047 A1 | 1/2020 | Mukobara et al. | |
| 2020/0243879 A1 | 7/2020 | Tanaka | |
| 2020/0251755 A1* | 8/2020 | Jahnke | H01M 8/04097 |
| 2020/0328445 A1* | 10/2020 | Weingaertner | H01M 8/0668 |
| 2021/0020974 A1 | 1/2021 | Ballantine et al. | |
| 2022/0223893 A1 | 7/2022 | Zhu et al. | |
| 2022/0352531 A1 | 11/2022 | Kemmer et al. | |

FOREIGN PATENT DOCUMENTS

| | | |
|---|---|---|
| DE | 10 2020 202 442 A1 | 8/2021 |
| EP | 1 722 107 A1 | 11/2006 |
| WO | WO-2008/092545 | 1/2008 |
| WO | WO-2009/059571 A1 | 5/2009 |
| WO | WO-02/1000003 A1 | 7/2020 |
| WO | WO-2022/241494 A1 | 11/2022 |

OTHER PUBLICATIONS

R. K. Ahluwalia and X. Wang, "Fuel Cells Systems Analysis"; Argonne National Laboratory https://www.hydrogen.energy.gov/pdfs/review13/fc017_ahluwalia_2013_o.pdf; downloaded Mar. 8, 2023.

M. Davdar et al., "Analysis of design parameters in anodic recirculation system based on ejector technology for PEM fuel cells: A new approach in designing"; International Journal of Hydrogen Energy 39 (2014) pp. 12061-12073.

"Fuel Cell Ejectors"; Fox Venturi Products, https://www.foxvalve.com/air-gas-steam-vacuum-ejectors/fuel-cell-ejectors/, downloaded Mar. 8, 2023.

"Ejector Driven Reactant Systems (EDRS)"; Teledyne Energy Systems; http://www.teledynees.com/our-products/fuel-cell-products/ejector-driven-reactant-systems-(edrs); downloaded Mar. 9, 2023.

* cited by examiner

FUEL CELL SYSTEM INCLUDING EJECTOR

CROSS-REFERENCE TO RELATED PATENT APPLICATIONS

This application claims the benefit of and priority to U.S. Provisional Application No. 63/285,274, filed Dec. 2, 2021, which is hereby incorporated herein by reference in its entirety.

BACKGROUND

The present disclosure relates generally to the field of electrochemical cells, such as fuel cells and electrolyzer cells, and more particularly to fuel cell systems with exhaust recycle systems.

Generally, a fuel cell includes an anode, a cathode, and an electrolyte layer that together drive chemical reactions to produce electricity. Multiple fuel cells may be arranged in a stack to produce the desired amount of electricity. Fuel, such as hydrogen gas or hydrocarbon gas, is supplied to the anode while oxidant is supplied to the cathode. The fuel and oxidant are used up by the electrochemical reactions as they flow over the anode and cathode, respectively.

To avoid depletion of the reactant gases before reaching all areas of the cell, more fuel and oxidant are supplied than can react before the gases pass through the cells and out of the stack. To avoid waste, the unreacted gas may be recycled back to the input of the fuel cell stack.

Solid oxide fuel cell anode exhaust reaches temperatures on the order of 750 degrees Celsius. Recycle systems often include specialized high temperature blowers to pressurize gas in the recycle stream. These blowers have very high material and manufacturing costs and still require the exhaust to be cooled significantly.

SUMMARY

Certain embodiments of the present disclosure may address the above-described problems with previous fuel cell systems.

In certain embodiments, a fuel cell system includes a fuel cell module comprising an anode section configured to output an anode exhaust stream, a first junction configured to split the anode exhaust stream into an anode recycle stream and a system outlet stream, and an ejector. The ejector comprises a low pressure inlet configured to receive a suction stream comprising a first portion of the anode recycle stream, a motive inlet configured to receive a motive stream comprising a second portion of the anode recycle stream, and an outlet configured to output an ejector output stream. The anode section is configured to receive an anode input stream that comprises the ejector output stream.

In some aspects, the fuel cell system further includes a cooler configured to cool and remove water from the second portion of the anode recycle stream.

In some aspects of the fuel cell system, the cooler is configured to spray a cold water stream over the second portion of the anode recycle stream to cool and condense steam out of the second portion of the anode exhaust stream.

In some aspects of the fuel cell system, the motive stream further includes a fresh fuel stream.

In some aspects, the fuel cell system further includes a compressor configured to receive and pressurize the motive stream before the motive stream is received by the motive inlet.

In some aspects, the fuel cell system further includes a cooler configured to reduce the temperature of the second portion of the anode recycle stream such that the motive stream received by the compressor is at a temperature within a range of 55 degrees Celsius to 80 degrees Celsius.

In some aspects of the fuel cell system, the system outlet stream is discharged from the fuel cell system.

In some aspects of the fuel cell system, the anode exhaust stream splits at the first junction such that the system outlet stream comprises between 25% and 35% of the anode exhaust stream, the anode recycle stream further splitting at a second junction such that the first portion of the anode recycle stream comprises between 12% and 22% of the anode exhaust stream and the second portion of the anode recycle stream comprises between 48% and 58% of the anode exhaust stream.

In some aspects, the fuel cell system further includes an anode preheater configured to receive and heat the ejector output stream.

In some aspects, the fuel cell system further includes a carbon dioxide separation stage configured to remove carbon dioxide from the motive stream, the carbon dioxide separation stage comprising a molten carbonate electrolyzer cell or an amine scrubber system.

In some aspects, the fuel cell system further includes a pre-reformer configured to at least partially reform methane in the ejector output stream.

In some aspects of the fuel cell system, the ejector is configured such that an ejector output stream to motive stream mass ratio in the ejector is within a range of 2.0 to 3.0 and the ejector has a motive pressure within a range of 20.0 psi to 30.0 psi at nominal operating conditions.

In certain embodiments, a method of recycling fuel cell anode exhaust is provided. The method includes separating an anode exhaust stream from a fuel cell module into a system outlet stream, a suction stream, and a dryer stream, discharging the system outlet stream away from the fuel cell module, directing the suction stream into a low pressure inlet of an ejector, directing at least a portion of the dryer stream into a motive inlet of the ejector, and directing an ejector output stream from an outlet of the ejector to an anode inlet of the fuel cell module.

In some aspects, the method further includes cooling and removing water from the dryer stream.

In some aspects, the method further includes removing carbon dioxide from the portion of the dryer stream.

In some aspects, the method further includes pressurizing the portion of the dryer stream.

In some aspects, the method further includes mixing a fresh fuel stream with the portion of the dryer stream before pressurizing the portion of the dryer stream.

In some aspects, the method includes cooling the portion of the dryer stream before pressurizing the portion of the dryer stream, and heating the ejector output stream before directing the ejector output stream to the anode inlet.

In some aspects of the method, the dryer stream comprises between 12% and 22% of the anode exhaust stream, the suction stream comprises between 48% and 58% of the anode exhaust stream, and the system outlet stream comprises between 25% and 35% of the anode exhaust stream.

In some aspects of the method, the ejector is configured such that an ejector output stream to motive stream mass ratio in the ejector is within a range of 2.0 to 3.0 and a motive pressure within a range of 20.0 psi to 30.0 psi at nominal operating conditions.

DETAILED DESCRIPTION

Figure 1:
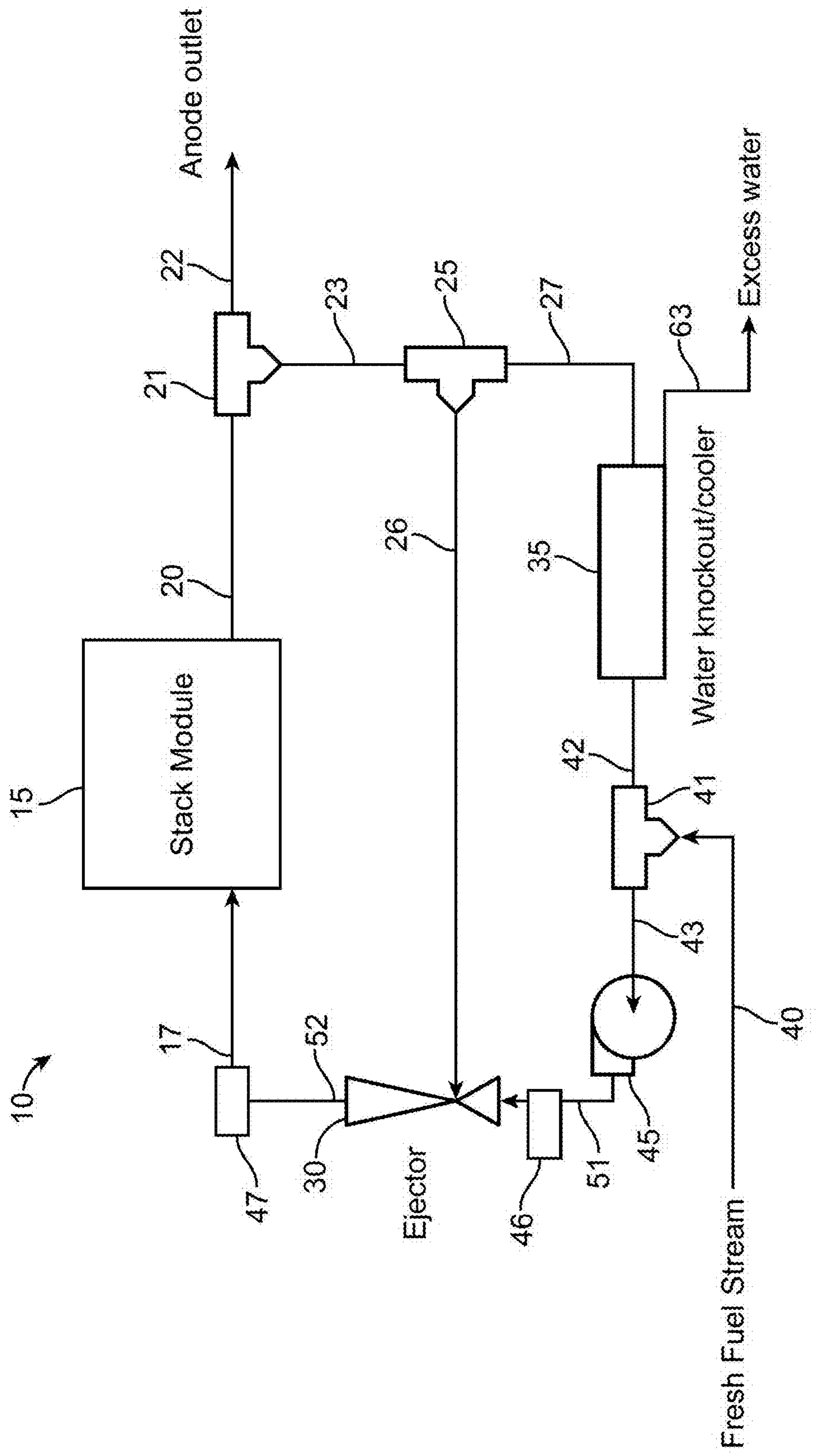
FIG. 1 is a schematic diagram of a fuel cell anode recycle system with an ejector according to an exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Certain embodiments of the present disclosure provide improved efficiency of fuel cell and electrolyzer cell systems. In particular, efficiency is improved using a blower driven ejector in the process recycle stream. An ejector is a mechanical device that accelerates a high pressure gas stream, or motive stream, through a nozzle to entrain a low pressure gas stream to form a pressurized output stream. In some embodiments, a high temperature blower can be replaced by a combination of a low temperature blower and an ejector in a recycle stream of a fuel cell system or an electrolysis cell system. Ejectors may be advantageous over high temperature blowers because they have no moving parts and can operate at high temperatures.

Referring to FIG. 1, a fuel cell system 10 according to an exemplary embodiment is shown. The fuel cell system includes an anode section and a cathode section. The fuel cell module 15 contains one or more fuel cells, each having an electrolyte sandwiched between an anode and a cathode. The fuel cells may be, for example, solid oxide fuel cells. Fuel, such as hydrogen or hydrocarbon fuel, may be fed to the anodes of the fuel cells, while oxidant may be fed to the cathodes of the fuel cells. An anode exhaust stream 20 containing unreacted fuel may leave the anode section of the fuel cell module 15 and may split at junction 21. A portion of the anode exhaust stream 20 may exit the fuel cell system 10 as system outlet stream 22 and be used for other purposes or vented to the atmosphere. Another portion of the anode exhaust stream 20 may be recycled or partially recycled to the fuel cell module 15 as anode recycle stream 23. In some embodiments, the system outlet stream 22 may comprise between 10% and 50%, or between 25% and 35% of the anode exhaust stream 20. Anode recycle stream 23 is circulated by means of the combined suction of ejector 30 and compressor 45 to junction 25, where a first portion may be circulated towards the ejector 30 as the suction stream 26 and a second portion may be circulated towards the cooler 35 as dryer stream 27. The suction stream 26 may comprise between 48% and 58% of the anode exhaust stream 20 and the dryer stream 27 may comprise between 12% and 22% of the anode exhaust stream 20.

In some embodiments, dryer stream 27 may be cooled in a cooler 35 until water vapor in the exhaust can condense into liquid water and be removed from the fuel cell system via discharge stream 63. In some embodiments, cooler 35 may cool the dryer stream 27 to a temperature above the condensation point of water, so that, while less water may be removed or water may not be removed, the compressor 45 is able to compress the gas and is not damaged by the heat. Cooler 35 simultaneously lowers the temperature of the dried recycle stream 42 in order to protect the compressor 45, as well as optionally knocking excess water from the dryer stream 27. Removing water from the recycle stream can result in increased efficiency of the fuel cell module 15 by reducing the fuel dilution effect. As discussed above, the dryer stream 27 may comprise between 12% and 22% of the anode exhaust stream 20. Thus, compared to a typical anode recycle stream in which all of the gas may be directed to a dryer, in the fuel cell system 10, a relatively small amount of gas is dried and used to pressurize the remaining gas via the ejector 30.

After the dryer stream 27 is dried, the dried exhaust may then exit the cooler 35 as dried recycle stream 42 and be combined with fresh fuel from the fresh fuel stream 40 to form the combined fuel stream 43 The combined fuel stream 43 may then be pressurized by the compressor 45. The fresh fuel stream 40 may be at a lower temperature and drier than the dried recycle stream 42, such that the combined fuel stream 43 is cool enough and dry enough to be compressed by the compressor 45. The temperature of the combined fuel stream 43 may be within a range of between 55 degrees Celsius and 80 degrees Celsius if the cooler 35 is configured to condense the water in the dryer stream 27, or up to 200 degrees Celsius depending on the compressor technology. It should be understood that "blower" and "compressor" are used interchangeably herein, and refer to a device configured to pressurize a gas. The combined fresh fuel and dried anode exhaust may be at a low enough temperature that the compressor 45 may be relatively inexpensive as compared to the compressors that may be required for high temperature pressurization. The pressurized gas from the compressor 45 may be directed to the ejector 30, where it may act as the motive stream 51. The motive stream 51 may pass through a narrowing nozzle in the ejector 30, which accelerates the gas and creates a low pressure zone inside the ejector.

The suction stream 26, which may be directed from the anode exhaust stream 20 to the ejector 30 without passing through the cooler 35 or the compressor 45, may be a low pressure gas stream that is entrained by the motive stream 51 in the ejector 30. The ejector 30 may combine the motive stream 51 and the suction stream 26 and output the combined gas as an ejector output stream 52. The ejector output stream 52 may include the gas from the fresh fuel stream 40, the suction stream 26, and the dried recycle stream 42. The ejector output stream 52 may then be directed to the fuel cell module 15 and fed to the anode as part or all of the anode input stream 17. The anode input stream may be heated to a temperature within a range of 630 degrees Celsius to 730 degrees Celsius.

The gas output from the compressor 45 is a stream with relatively high carbon dioxide, relatively low moisture, at a relatively low temperature, and somewhat pressurized. Alternately the gas output from cooler 35 has higher carbon dioxide concentration, but lower pressure. A carbon dioxide separation stage 46 could be added to the system at this point. For example, the gas could be input into the anode of a molten carbonate electrolyzer cell that allows the carbon dioxide to cross over the electrolyte while hydrogen passes through the anode without crossing the electrolyte. Alternatively, an amine scrubber system could be used to capture carbon dioxide. Regardless of the method used, the high concentration of carbon dioxide can facilitate carbon capture.

Figure 2:
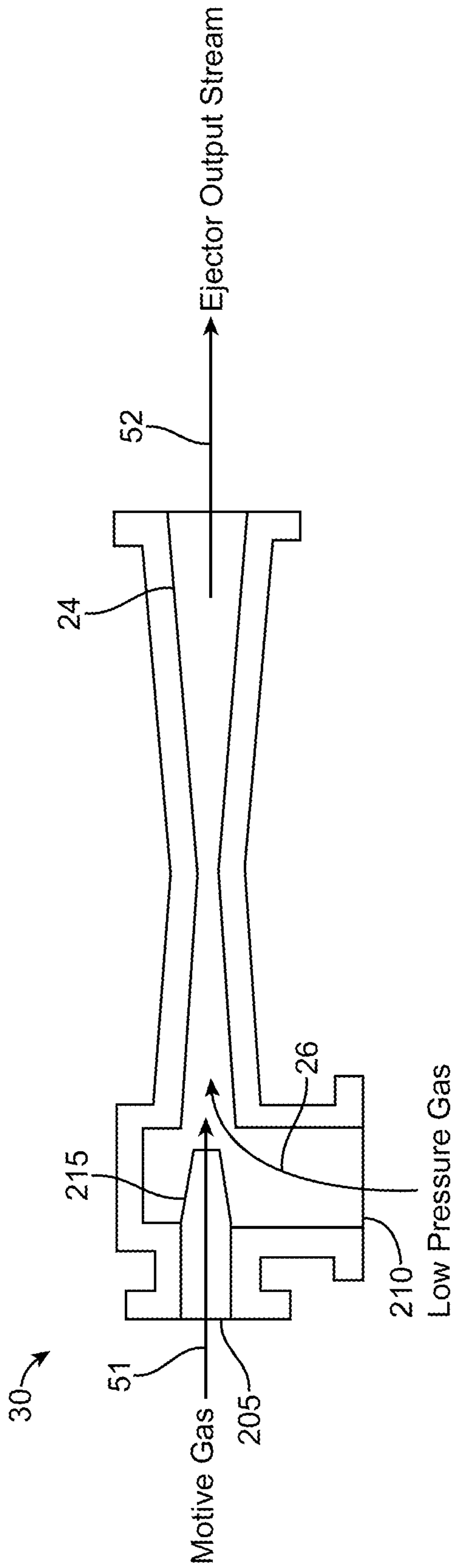
FIG. 2 is a schematic diagram of an ejector according to an exemplary embodiment.

Referring to FIG. 2, an ejector 30 according to an exemplary embodiment is shown. A motive stream 51 may enter the ejector 30 through the motive inlet 205. The motive stream 51 may be a combination of fresh fuel stream 40 and the dryer stream 27. The dryer stream 27 of may be cooled to remove some or all of the water before it is combined with the fresh fuel to form the motive stream 51. The dryer stream 27 may be a first portion of the anode recycle stream 23. A low pressure gas, such as suction stream 26, may enter the ejector 30 through the low pressure inlet 210. The suction stream 26 may be a second portion of the anode recycle stream 23. The motive stream 51 may pass through a narrowing nozzle 215 where the velocity of the motive stream 51 may increase. This increase in velocity may reduce the pressure of the motive stream 51 according to Bernoulli's principle. The reduced pressure may cause the suction stream 26 to be entrained by the motive stream 51. The motive stream 51 and the suction stream 26 may be combined in the ejector 30 and output from the outlet 24 of the ejector 30 as an ejector output stream 52. The ejector 30 may have a motive pressure within the range of 20.0 to 30.0 psi and an ejector output stream to motive stream mass ratio within the range of 2.0 to 3.0 at nominal operating conditions. The ejector 30 may have no moving parts and may be relatively tolerant to high temperatures. There may be no need (or only limited need) to provide recuperative heat exchange to protect the ejector 30, unlike when using a traditional recycle blower. In addition, by recirculating a significant portion of the recycle stream 23 without cooling (i.e. suction stream 26) the combined anode input stream 17 can be significantly hotter than if the whole stream was cooled to run through a conventional blower. This reduces or potentially eliminates the need for gas preheat/recuperation at the stack module inlet. Recuperative heat exchangers can be significant contributors to overall system cost.

While it is possible to use an ejector 30 with just the fresh fuel stream 40 as the motive stream 51, this may result in suboptimal results in certain cases. Ejectors have specific performance profiles that dictate the ratio of motive flow to suction flow, which may be incompatible with system operating targets. Specifically, an ejector may be designed to be optimized for certain flow rates and pressures, but may have poor or even inoperable conditions at off-design cases. When the fuel cell system 10 is operating at part-load conditions, there may not be enough fresh fuel entering the system to act as the motive stream 51. Certain embodiments of the present disclosure avoid that problem by using a portion of the recycle stream in the motive stream 51 instead of using only the fresh fuel stream 40, which is at a fixed pressure and for which there will be a fixed target flow rate for a given system operating point.

A general limitation of pure ejector driven systems is turndown, for example, when the fuel cell is operating at reduced output. As motive flow drops, the ability of the ejector to provide useful motive to output mass flow ratios decreases. This means that there will be a certain minimum ejector motive flow required to maintain useful ejector performance. The present system greatly expands the operability window via two mechanisms. First, since the motive stream 51 is provided by compressor 45, it can be independent of the input rate of fresh fuel stream 40, even at part load conditions. Second, since fresh fuel and a portion of the recycle stream is directly provided by compressor 45, the system 10 can continue to operate even if the performance of ejector 30 drops due to lower motive flow. As system turndown increases, a larger portion of the anode input stream 17 will be provided by the compressor 45.

The anode exhaust stream 20 may contain unreacted fuel as well as the products of reaction, including water. Additional efficiency can be gained due to the removal of water from the first portion of the anode exhaust (e.g., the dryer stream 27), thus increasing the concentration of reactants in the recycle stream (e.g., in the anode input stream 17). Because only a portion of the anode exhaust is cooled (e.g., the dryer stream 27), the cooler 35 may be sized accordingly and may cool the portion of the exhaust relatively quickly. The removal of water vapor from this portion of the anode exhaust offers sufficient improvement in reactant concentration at the fuel cell inlet (e.g., in the anode input stream 17) to offer significant efficiency improvements, in the range of 2% to 4%. Water vapor may be removed in a number of ways. Direct contact spray towers may be used where appropriate. If a coolant stream is available, the water may be cooled and condensed using a liquid to liquid heat exchanger. If a coolant stream is not available, a liquid to air heat exchanger may be used. If freezing is a concern, a gas to air condenser or a gas to glycol loop may be used, keeping the condensed water above freezing temperature. Cooling of the dryer stream 27 to below the condensation temperature of water results in a decrease in the temperature of the resulting ejector output stream 52. This may require the gas to be heated before it reaches the fuel cells, for example by an anode preheater 47. Some of this heat may be recuperated from radiant heat inside the module or the gas may be heated before it enters the fuel cell module 15. Nevertheless, the removal of water from the dryer stream 27 results in efficiency gains that may outweigh any losses due to the additional heating of the anode input stream 17 before reaching the fuel cells.

System Models

Figure 3:
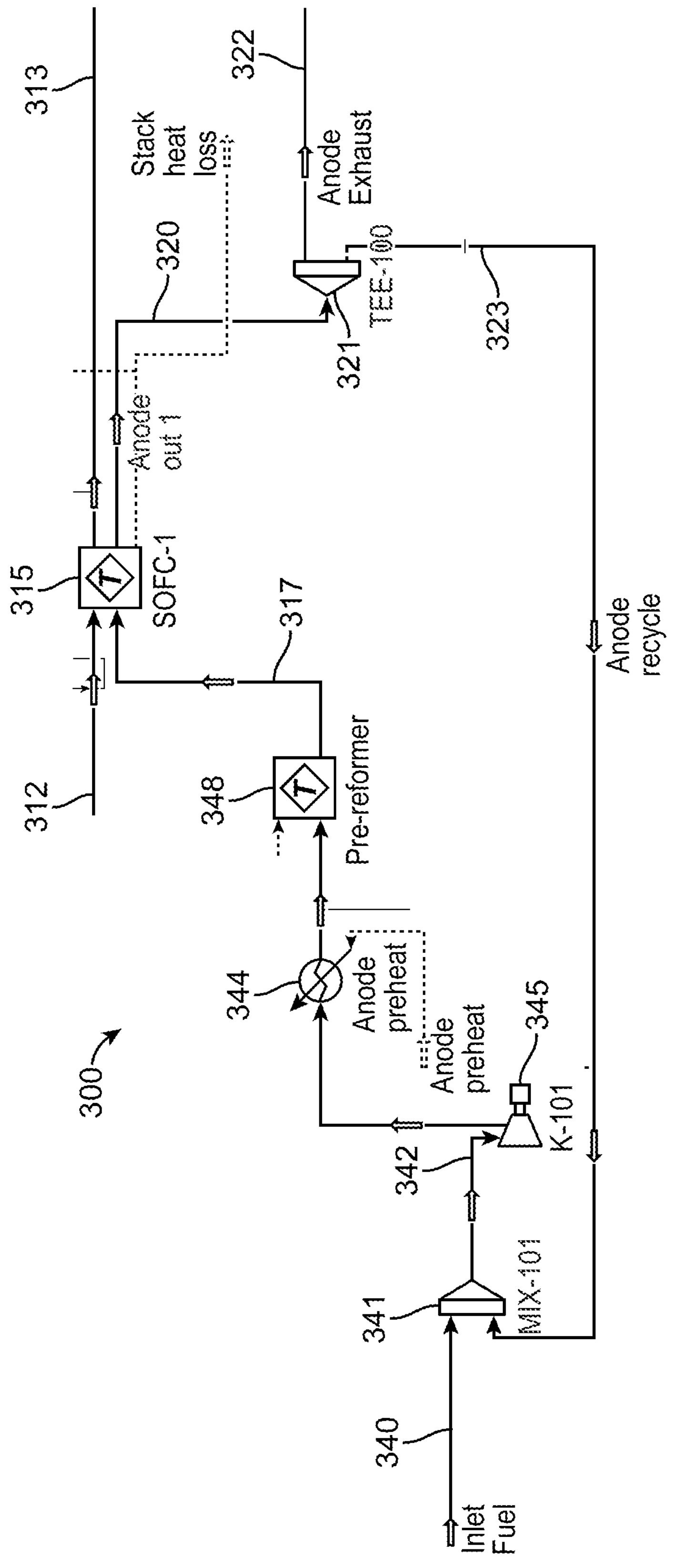
FIG. 3 is a schematic diagram of a baseline anode recycle system.

Fuel cell system simulation models were created to compare the expected efficiency of the ejector-based recycle systems according to exemplary embodiments to the baseline design incorporating a high-temperature blower without an ejector. The models were built to target a gross DC system power output of 61.4 kW. A first system was modeled with a traditional anode recycle blower without an ejector. Referring to FIG. 3, a portion of the first system model 300 is shown. Fuel cell module 315 receives an anode input stream 317 of fuel and outputs an anode exhaust stream 320 containing fuel that did not react in the fuel cell module 315. Fuel cell module 315 also receives a cathode inlet stream 312 and outputs a cathode outlet stream 313. The anode exhaust stream 320 is divided at mixer 321 into a system outlet stream 322 and an anode recycle stream 323. The system outlet stream 322 is not returned to the fuel cell module and may be used elsewhere in the system, vented to the atmosphere, or used for other purposes. The anode recycle stream 323 is combined with a fresh fuel stream 340 in mixer 341 to form combined fuel stream 342. Combined fuel stream 342 is directed to compressor 345, which was modeled at 75% efficiency, which compresses the fuel and moves it towards the fuel cell module 315. Combined fuel stream 342 is heated by the anode preheater 344 and the methane in the combined fuel stream 342 is at least partially reformed to hydrogen in pre-reformer 348. The anode preheater 344 may be a heat exchanger and the heat may be drawn from other portions of the system to heat the ejector output stream 452. The combined fuel stream 342 is then directed to the fuel cell module 315.

Figure 4:
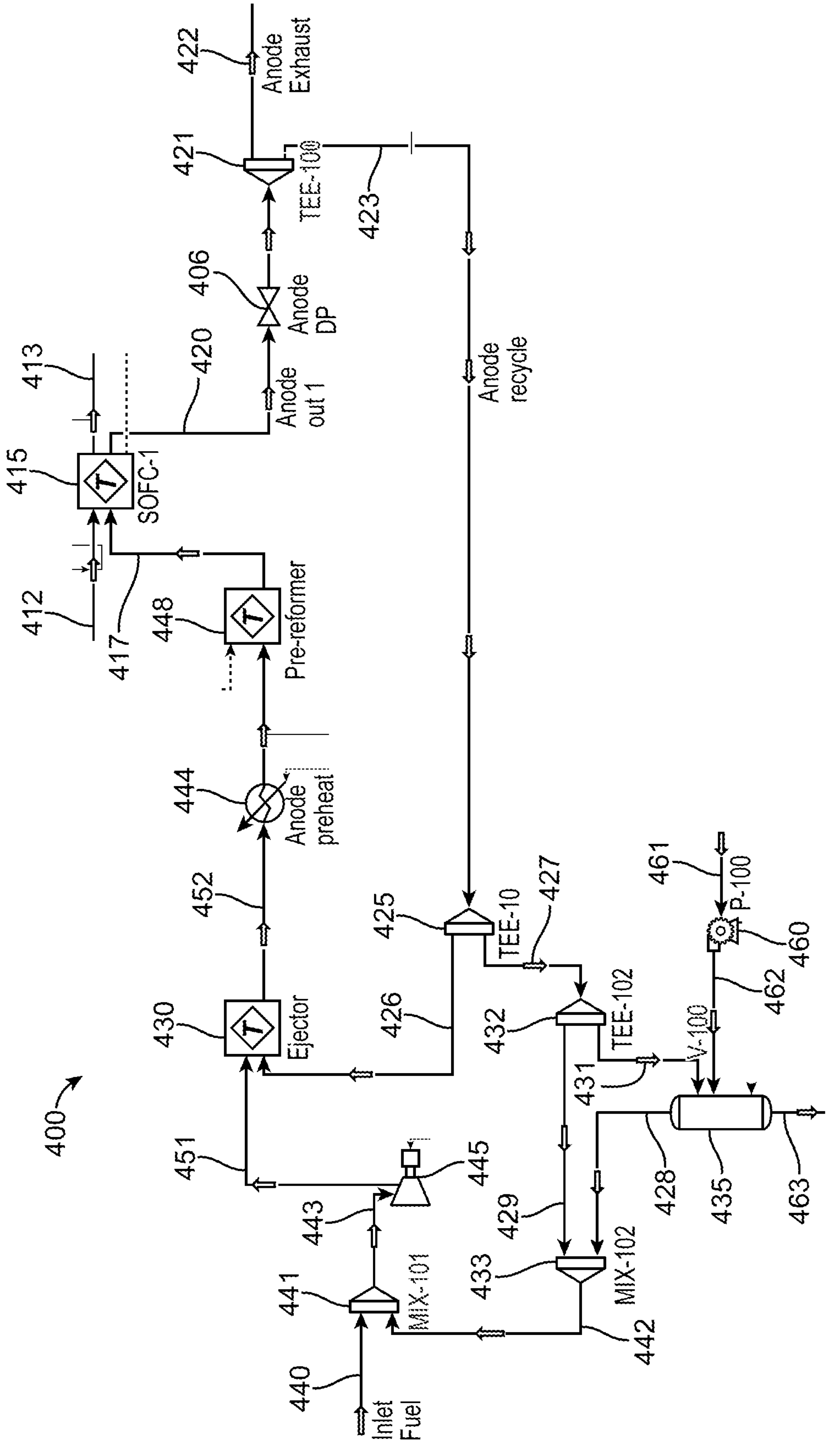
FIG. 4 is a schematic diagram of an anode recycle system with an ejector, according to an exemplary embodiment.

A second system was modeled with an ejector-based anode recycle stream, according to an exemplary embodiment. Referring to FIG. 4, a portion of the second system model 400 is shown. The elements identified by the reference numerals in FIG. 1 are the same or similar to elements identified by the reference numerals in FIG. 4, with the corresponding numerals in FIG. 4 being 400 higher than those in FIG. 1 (e.g. fuel cell module 15 corresponds fuel cell module 415). Fuel cell module 415 receives an anode input stream 417 of fuel and outputs an anode exhaust stream 420 containing fuel that did not react in the fuel cell module 415. Fuel cell module 415 also receives a cathode inlet stream 412 and outputs a cathode outlet stream 413. The anode exhaust stream 420 is divided at mixer 421 into a system outlet stream 422 and an anode recycle stream 423. The gas in the system outlet stream 422 is not returned to the fuel cell module may be used elsewhere in the system vented to the atmosphere, or used for other purposes. The anode recycle stream 423 is divided at splitter 425 into an ejector suction stream 426 and a dryer stream 427 at splitter 432. The ejector suction stream 426 is directed to the ejector 430.

The dryer stream 427 is directed to splitter 432, where it is divided between water knockout stream 431 and the bypass stream 429. The water knockout stream is directed to a water knockout cooler 435. A cold water stream 461 is directed to sprayer 460, which outputs a cold water sprayer stream 462. Cold water in the cold water sprayer stream 462 is sprayed over the gas from the water knockout stream 431 to cool the gas and condense out water vapor from the stream 431. The dried gas is output from the top of the cooler 435 via dried recycle stream 428, and the water from the cold water sprayer stream 462 and the water that condensed out of the water knockout stream 431 is discharged from the cooler 435 via discharge stream 463. The dried recycle stream 428 is then recombined with the bypass stream 429 in mixer 433. The proportions of the dryer stream 427 that are divided into the water knockout stream 431 and the bypass stream 429 can be controlled based on how much water is desired to be removed from the dryer stream 427. For example, if it is desired that 90% of the water in the dryer stream 427 is removed, 90% of the dryer stream 427 may be directed to the water knockout stream 431 and 10% may be directed to the bypass stream 429. Alternatively, in practice, the cooler 435 may be selectively configured to remove less than all of the water from the stream and the dryer stream 427 may not need to be split. For example, the dryer stream 427 may be directed directly into the cooler 435 without being split in splitter 432. The cooler 435 may then remove 90% of the water from the dryer stream 427. Table I shows the volume of water expected to be discharged via discharge stream 463, the excess heat to be removed from the ejector systems, and the amount of waste heat required to revaporize the condensed water if liquid water cannot be disposed of on site.

TABLE I

| | | 85% uf system | 90% uf system |
|---|---|---|---|
| Condensed water stream flow | Mol/s | 0.06 | 0.09 |
| | Kg/hr | 3.9 | 5.8 |
| Enthalpy of vaporization | kW | 2.6 | 4.0 |
| Excess System Heat* | kW | 34.5 | 32 |
| % of waste heat required to re-vaporize waste stream | | 7.5% | 12.5% |

TABLE I-continued

The dried recycle stream 428 is recombined with the bypass stream 429 in mixer 433 to form a combined dryer stream 442. The combined dryer stream 442 is further combined with fuel from the fresh fuel stream 440 in mixer 441 to form fuel stream 443. Fuel stream 443 is directed to a compressor 445. The compressor 445 was modeled with a pressure ratio of about 2.7 and an efficiency of 75%. The blower inlet temperature was modeled up to a maximum of 74 degrees Celsius, which is within the range of standard or near standard components. Cooling a portion of the dryer stream 427 before combining it with the fresh fuel stream 440 enables the use of a much less expensive blower/compressor than would be required to pressurize a high temperature anode recycle stream. The compressor 445 compresses the fuel stream 443 and outputs a motive stream 451 that is directed to an ejector 430. The ejector sub-model is shown in detail in FIG. 5.

The ejector 430 may be equivalent to the ejector 30, as shown in FIG. 2, with the motive stream 451 being directed into the motive inlet 205 and the suction stream 426 being directed into the low pressure inlet 210. The motive stream 451 accelerates as it passes through the narrowing nozzle 215 and entrains the suction stream 426. The ejector 430 outputs an ejector output stream 452. The ejector output stream 452 will have a pressure that is between the higher pressure of the motive stream 451, which has been compressed by compressor 446, and the low pressure of the suction stream 426. For a fuel cell system of this size, a motive stream flow rate of about 2.65 scfm and a suction stream flow rate of about 4.0 scfm would be required The ejector output stream 452 may be heated by anode preheater 444 and the methane in the combined fuel stream 342 may be at least partially reformed to hydrogen in pre-reformer 448. The anode preheater 444 may be a heat exchanger and may draw heat from other portions of the system to heat the ejector output stream 452. The ejector output stream 452 is then at least partially reformed in a pre-reformer 448. The performer outputs the reformed fuel as the anode input stream 417. The second system model 400 also includes a pressure drop simulator 406 to account for any inefficiencies in the system. The portions of the models 300, 400 not shown may be the same or essentially the same between models.

Figure 5:
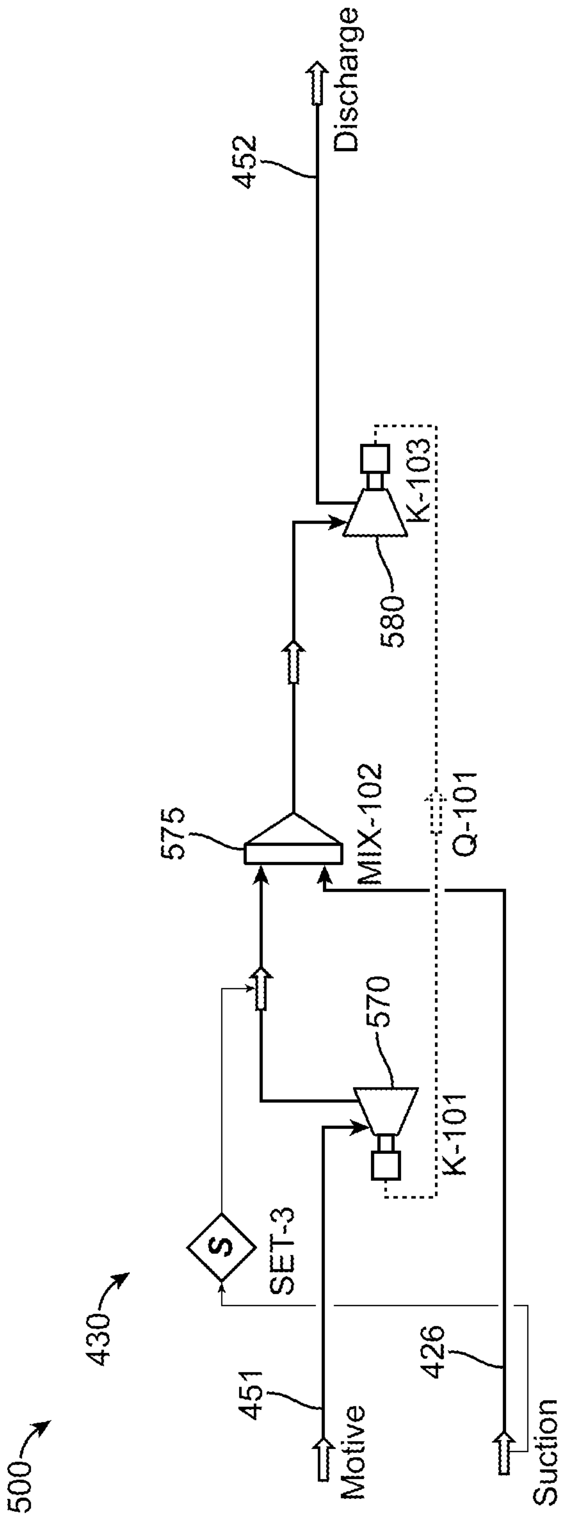
FIG. 5 is a schematic diagram of an ejector, according to an exemplary embodiment.

FIG. 5 illustrates a sub-model 500 of the ejector 430. The model is configured to determine the exit pressure and flow rate of the ejector based on the pressure of the motive stream 451 and the suction stream 426, rather than to perfectly simulate the mechanism of the ejector. The motive stream is directed to the expander 570. The exit pressure of the expander 570 is set to the pressure of the suction stream 426 and the energy from the drop in pressure is directed to the compressor 580. The motive stream 451 and the suction stream 426 are combined in mixer 575 and directed to the compressor 580. The energy from the pressure drop in the expander 570 is added to the combined motive stream 451 and suction stream 426 and the ejector output stream 452 is output from the compressor 580. The energy from the motive stream 451 is thus used to pressurize the ejector output stream 452 to a pressure between that of the motive stream 451 and the suction stream 426. The ejector 430 was modeled with an expander efficiency of 99% and a compressor efficiency of 25%, corresponding to an overall efficiency of about 25%. A motive pressure of 25.3 psi and an ejector output stream to motive stream mass ratio of 2.5 were selected. These performance qualities are within reasonable expectations of from ejector performance.

In a first configuration, the second system was modeled to maintain all conditions as close to the same as the first (baseline system) model as possible. For example, the ejector model targeted the same system fuel utilization, the same stack fuel utilization, the same temperature, the same recycle ratio, etc. Next, in a second configuration, the ejector system was modeled with an ejector-based anode recycle stream, according to an exemplary embodiment, with a view toward possible performance improvements. The second configuration was modeled to target a higher system fuel utilization ratio without a major increase to the stack fuel utilization. In general, the stack fuel utilization is kept below 100% in order to prevent depletion of the fuel before it can reach every portion of the fuel cells. In the baseline system (i.e. the first system model 300) and both configurations of the ejector system (i.e. the second system model 400), 15% pre-reforming by the pre-reformer 448 was assumed. An anode inlet temperature of 680 degrees Celsius was targeted. In each case, the fuel must be heated before being input to the fuel cell module. In the baseline system, 4.9 kW of energy must be added to the fuel to heat it to this temperature. In the first and second configurations of the ejector system, 7.2 kW and 7.6 kW of energy were required, respectively, to heat the fuel to 680 degrees Celsius. Additional heat is required because a portion of the recycle stream is cooled and dried in the cooler 435.

Initial expectations were that there would be an efficiency penalty due to the combination of a blower and an ejector, but that the penalty would be so minimal that it would be worth including the ejector to enable the use of a low temperature blower. However, when the systems were evaluated, the results showed that the system efficiency actually increased due to the reduced steam content in the recycle stream due to the water knockout cooler 435 and the ability to increase system fuel utilization. Table II shows the comparison of the results between the base system (i.e. the first model 300), the matched ejector system (i.e. the first configuration of the second system model 400) and the improved ejector system (i.e. the second configuration of the second system model 400).

TABLE II

| | | Base system | Matched ejector system | Improved ejector system |
|---|---|---|---|---|
| Gross DC power | kW | 61.4 | 61.4 | 61.4 |
| Cell voltage | V/cell | 0.845 | 0.868 | 0.837 |
| Methane inlet flow | gmol/s | 0.1107 | 0.108 | 0.106 |
| Chemical power in Fuel side | kW | 98.53 | 96.03 | 94.06 |
| System uf | — | 85% | 85% | 90% |
| Stack uf | — | 68.37% | 68.37% | 70.07% |

As discussed above, a gross power output of 61.4 kW was targeted for each case. The base system and matched ejector system each targeted a system fuel utilization ratio of 85%, the optimal fuel utilization ratio for the base system. The improved ejector system was optimized at a system fuel utilization ratio of 90%. Due to higher performance by the ejector models flow, less fresh fuel needs to be added via the fresh fuel stream 440. This is shown in the rows labeled "Chemical power in and Methane inlet flow." The stack fuel utilization ratio (Stack uf) and percent direct internal reforming (% DIR) was similar in all cases.

TABLE III

| | | Base system | Matched ejector system | Improved ejector system |
|---|---|---|---|---|
| Blower inlet temperature | ° C. | 648.8 | 60.2 | 73.7 |
| Blower outlet pressure | psig | 0.5 | 25.3 | 25.3 |
| Blower efficiency (assumed) | — | 75% | 75% | 75% |
| Ejector efficiency (assumed) | — | n/a | 25% | 25% |
| Ejector mass ratio (suction/motive) | — | n/a | 2.57 | 2.49 |
| Recycle power draw | kW | 0.2792 | 0.7739 | 1.061 |
| Effiency impact (blower losses) | — | | −0.5% | −0.8% |
| Efficiency impact (system fuel consumption) | — | | 2.5% | 4.5% |
| Net efficiency impact (+ve = good) | — | | 2.0% | 3.7% |

Table III illustrates the power requirements of the three cases. The blower inlet temperature in the base system is much higher than the blower inlet temperature of the ejector systems because the base system model does not include cooling the anode recycle stream. In practice cooling is almost always used in order to protect the blowers and allow them to operate at lower temperatures where they are more efficient. For the purposes of efficiency calculations this base model assumes that a special blower is available that is able to operate at high temperature and high efficiencies. This likely unrealistically favors the base system model as compared to the ejector systems. Because the base system avoids an ejector the base blower outlet pressure need not be as high. Because the ejector systems include cooling and drying a portion of the anode recycle stream, the fuel entering the blower is much cooler, and off-the-shelf blowers/compressors may be used. Further, because only a portion of the anode recycle flow is directed to the blower, the blower can be much smaller than in the base system where the entire recycle flow passes through the blower.

There is an efficiency penalty in the ejector systems because the blowers in the ejector systems require more power than in the base system, as shown in the row labeled "Recycle power draw." This results in a total loss in net efficiency of 0.5% and 0.8% for the matched ejector system and the improved ejector system, respectively. However, the ejector systems respectively consume 2.5% and 4.5% less fresh fuel than the base system. Overall, this results in a 2.0% increase in net efficiency in the matched ejector system and a 3.7% increase in net efficiency in the improved ejector system.

Carbon Deposition

The system models presented show the case of a natural gas fed solid oxide fuel cell system. In these systems consideration must be made for carbon activity in the fuel streams. High carbon activity levels increase the risk of carbon deposition, which can be catastrophic to system operation. Table VI compares the carbon activity at three points in the system, comparing the baseline system to the 85% uf and 90% uf ejector system cases.

TABLE VI

| | Baseline system | 85% uf single ejector | 90% uf single ejector |
|---|---|---|---|
| Pre-reformer outlet | 0.203 @ 680° C. | 0.519 @ 680° C. | 0.254 @ 680° C. |
| Ejector Motive (recycled motive) | n/a | 37.8 @ 168° C. | 36.3 @ 184° C. |
| Fuel inlet (at mixT) | 39918 @ 648° C. | 11991 @ 60° C. | ~12000 @ 74° C. |

The carbon activity data indicates that all systems have acceptable gas composition sin their anode recycle loops. Carbon activity is at a maximum where the fresh fuel stream is mixed with the recycle loop. However, the ejector systems have lower carbon activity than the baseline system at this point and the carbon activity in the ejector motive flow is much lower. The ejector systems should not pose additional challenges due to carbon activity that are not already present in the baseline system.

Configuration of Example Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fuel cell system comprising:
- a fuel cell module comprising an anode section configured to output an anode exhaust stream;
- a first junction configured to split the anode exhaust stream into an anode recycle stream and a system outlet stream;
- a second junction configured to split the anode recycle stream into a first portion and a second portion;
- a cooler configured to cool and remove water from the second portion of the anode recycle stream;
- a compressor configured to:
  - receive and pressurize a fuel stream comprising the dried second portion of the anode recycle stream and a fresh fuel stream; and
  - output a pressurized fuel stream;
- a carbon dioxide separation stage configured to remove carbon dioxide from the pressurized fuel stream and output a motive stream, the carbon dioxide separation stage comprising a molten carbonate electrolyzer system or an amine scrubber system; and
- an ejector comprising:
  - a low pressure inlet configured to receive a suction stream comprising the first portion of the anode recycle stream;
  - a motive inlet configured to receive the motive stream; and
  - an outlet configured to output an ejector output stream;
- wherein the anode section is configured to receive an anode input stream that comprises the ejector output stream.

2. The fuel cell system of claim 1, wherein the cooler is configured to spray a cold water stream over the second portion of the anode recycle stream to cool and condense steam out of the second portion of the anode exhaust stream.

3. The fuel cell system of claim 1, wherein the cooler is configured to reduce the temperature of the second portion of the anode recycle stream such that the fuel stream received by the compressor is at a temperature within a range of 55 degrees Celsius to 80 degrees Celsius.

4. The fuel cell system of claim 1, wherein the first junction and the second junction are configured to split the anode exhaust stream such that the system outlet stream comprises between 25% and 35% of the anode exhaust stream, the first portion of the anode recycle stream comprises between 12% and 22% of the anode exhaust stream, and the second portion of the anode recycle stream comprises between 48% and 58% of the anode exhaust stream.

5. The fuel cell system of claim 1, further comprising an anode preheater configured to receive and heat the ejector output stream.

6. The fuel cell system of claim 1, further comprising a pre-reformer configured to at least partially reform methane in the ejector output stream.

7. The fuel cell system of claim 1, wherein the ejector is configured such that an ejector output stream to motive stream mass ratio in the ejector is within a range of 2.0 to 3.0 and a motive pressure of the ejector is within a range of 20.0 psi to 30.0 psi at nominal operating conditions.

8. The fuel cell system of claim 1, further comprising a third junction configured to separate a bypass stream from the second portion of the anode recycle stream and a mixer configured to re-mix the bypass stream with the dried second portion of the anode recycle stream after water is removed from the second portion of the anode recycle stream in the cooler, wherein the bypass stream bypasses the cooler and is re-mixed with the second portion of the anode recycle stream before the dried second portion of the anode recycle stream is provided to the ejector as part of the motive stream.

9. The fuel cell system of claim 1, wherein the carbon dioxide separation stage comprises a molten carbonate electrolyzer system.

10. The fuel cell system of claim 1, wherein the carbon dioxide separation stage comprises an amine scrubber system.

11. The fuel cell system of claim 1, wherein the fuel cell system is configured to mix a third portion of the anode exhaust stream with the dried second portion of the anode recycle stream before the dried second portion of the anode recycle stream is received by the compressor.

12. A method of recycling fuel cell anode exhaust using the system of claim 1, the method comprising:

separating, at the first junction, an anode exhaust stream from the anode section into the system outlet stream and the anode recycle stream;

separating, at the second junction, the anode recycle stream into the first portion and the second portion;

discharging the system outlet stream away from the fuel cell module;

directing the first portion of the anode recycle stream into the low pressure inlet of the ejector;

cooling the second portion of the anode recycle stream in the cooler and removing condensed water from the second portion of the anode recycle stream;

pressurizing the fuel stream comprising the dried second portion of the anode recycle stream using the compressor;

removing carbon dioxide from the pressurized fuel stream in the carbon dioxide separation stage to generate the motive stream;

directing the motive stream into the motive inlet of the ejector; and directing the anode input stream including the ejector output stream to an anode inlet of the fuel cell module.

13. The method of claim 12, further comprising mixing the fresh fuel stream with the dried second portion of the anode recycle stream before pressurizing the fuel stream.

14. The method of claim 13, further comprising heating the ejector output stream before directing the ejector output stream to the anode inlet.

15. The method of claim 12, wherein the first portion of the anode recycle stream comprises between 12% and 22% of the anode exhaust stream, the second portion of the anode recycle stream comprises between 48% and 58% of the anode exhaust stream, and the system outlet stream comprises between 25% and 35% of the anode exhaust stream.

16. The method of claim 12, wherein the ejector is configured such that an ejector output stream to motive stream mass ratio in the ejector is within a range of 2.0 to 3.0 and a motive pressure is within a range of 20.0 psi to 30.0 psi at nominal operating conditions.

17. The method of claim 12, wherein removing water from the second portion of the anode recycle stream comprises separating the second portion of the anode recycle stream into a water knockout stream and a bypass stream, cooling the water knockout stream to remove water, and recombining the dried water knockout stream and the bypass stream.

* * * * *